United States Patent
Tachi et al.

(10) Patent No.: US 6,909,084 B2
(45) Date of Patent: Jun. 21, 2005

(54) OPTICAL TACTILE SENSOR HAVING A TRANSPARENT ELASTIC TACTILE PORTION

(75) Inventors: Susumu Tachi, Tsukuba (JP); Hiroyuki Kajimoto, Yokohama (JP)

(73) Assignee: Toudai TLO, LTD, Tokyo (JP)

( * ) Notice: Subject to any disclaimer, the term of this patent is extended or adjusted under 35 U.S.C. 154(b) by 308 days.

(21) Appl. No.: 10/344,821

(22) PCT Filed: Aug. 30, 2001

(86) PCT No.: PCT/JP01/07462
§ 371 (c)(1),
(2), (4) Date: Feb. 14, 2003

(87) PCT Pub. No.: WO02/18893
PCT Pub. Date: Mar. 7, 2002

(65) Prior Publication Data
US 2003/0178556 A1 Sep. 25, 2003

(30) Foreign Application Priority Data
Aug. 31, 2000 (JP) .................................. 2001-264407

(51) Int. Cl.[7] .............................................. H01J 40/14
(52) U.S. Cl. .................................... 250/221; 250/231.1
(58) Field of Search .............................. 250/221, 231.1, 250/559.33, 216, 559.4, 226; 340/407.2; 345/173, 175

(56) References Cited

U.S. PATENT DOCUMENTS

| 4,599,908 A | 7/1986 | Sheridan et al. |
| 4,668,861 A | 5/1987 | White |
| 5,311,779 A * | 5/1994 | Teruo .......................... 73/726 |

FOREIGN PATENT DOCUMENTS

| JP | 61-205831 | 9/1986 |
| JP | 62-115308 | 5/1987 |
| JP | 02-198306 | 8/1990 |
| JP | 03-135704 | 6/1991 |
| JP | 09-257609 | 10/1997 |
| JP | 2000-227371 | 8/2000 |

* cited by examiner

Primary Examiner—Que T. Le
(74) Attorney, Agent, or Firm—Ladas & Parry LLP (57) ABSTRACT

The invention relates to a tactile sensor capable of obtaining information for a plurality of degrees of freedom at each point on a surface by introducing multi-channel sensing that uses color or optical spectrum to an optical tactile sensor. An optical tactile sensor is provided with a tactile section and imaging means, the tactile section comprising a transparent elastic body and a plurality of groups of markers provided inside the elastic body, each marker group being made up of a number of colored markers, with markers making up different marker groups having different colors for each group, and behavior of the colored markers when an object touches the elastic body being photographed by the imaging means. Preferably, the marker groups have mutually different spatial arrangements.

37 Claims, 10 Drawing Sheets

(1) Rods by Macaroni Method

(2) Dip Markers into Transparent Body

Red Surface    Blue Surface

OPTICAL TACTILE SENSOR HAVING A TRANSPARENT ELASTIC TACTILE PORTION

TECHNICAL FIELD

The present invention relates to an optical tactile sensor, and preferably to a tactile sensor used for a robot hand.

BACKGROUND ART

Figure 10:
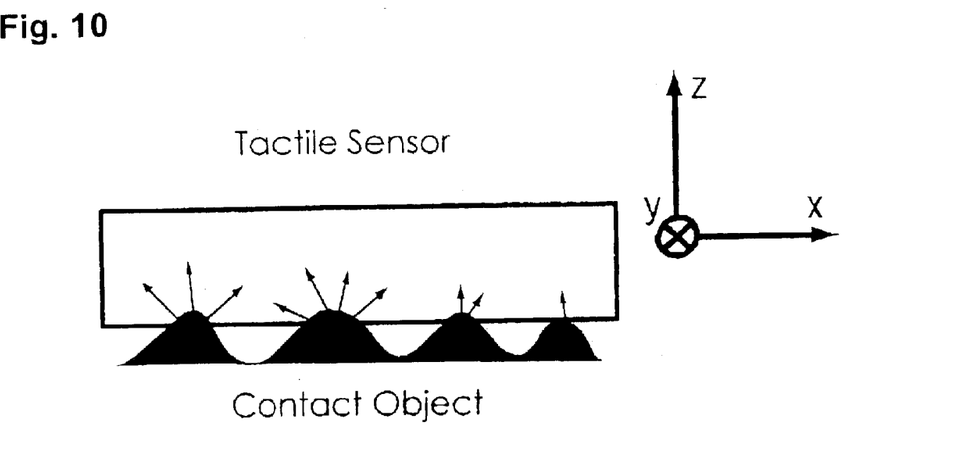
FIG. 10 is a drawing showing force vector distribution arising between a tactile sensor and a contact object.

When considering understanding the contact state of a contact surface using a tactile sensor, there are vectors of three components representing size and direction of force acting at each point of the contact surface. This is represented as f(x,y) in the coordinate system of FIG. 10. However, f is a vector, and so actually has three components x, y and z at each point. When explicitly expressing each component, it is represented as f(x,y)=[fx(x,y), fy(x,y), fz(x,y)].

Since force distribution has three components at each contact point, in order to reconstitute force distribution of a contact surface using a tactile sensor it is necessary to acquire information for each contact point on the contact surface with at least three degrees of freedom. However, a lot of surface type tactile sensors that are presently being used only acquire information for at best one degree of freedom for each point of the contact surface, as in cases where, for example, conductive rubber is used. Therefore, even if it is possible to ascertain the condition of a force generally acting and its distribution, it is difficult to determine whether this force is perpendicular to the surface, for example, or acting horizontally. This is because only a third of the information is obtained that would allow such determination to be made.

On the other hand, as specific sensing means, optical type tactile sensors have recently been attracting attention. With this method, differing from the conventional method where mechanical elements (such as piezoelectric elements) are used for direct measurement of stress, a sensor body is implemented as a transparent elastic body and a marker buried inside the transparent elastic body for causing variation in optical behavior using any force. The condition of the contact surface is then estimated by photographing behavior of the marker using an imaging system such as a CCD element. The advantage of this is that with the advancement of imaging elements in recent years they have become much cheaper than mechanical alternatives, and it is possible to construct high density tactile sensors. With this method, however, in a lot of instances this information has upward or downward displacement or pressure and the previously described problem where information is lacking is not resolved. Even with a conventional optical tactile sensor, derivation of only one type of information (one dimensional information) is achieved. The present invention has been conceived to resolve the drawbacks of conventional tactile sensors, and has as an object to provide a tactile sensor that can acquire information for a plurality of degrees of freedom at each point on a surface by introducing multi-channel sensing using color, that is, a light spectrum, to an optical tactile sensor.

DISCLOSURE OF THE INVENTION

The present invention has been conceived to resolve the problems mentioned, and provides an optical tactile sensor provided with a tactile section and imaging means, the tactile section comprising a transparent elastic body and a plurality of groups of markers provided inside the elastic body, each marker group being made up of a number of colored markers, with markers making up different marker groups having different colors for each group, and behavior of the colored markers when an object touches the elastic body being photographed by the imaging means. At least one of displacement, strain and inclination of the colored markers when the elastic body is touched by a body is observed by photographing behavior of the colored markers. Strain information inside the transparent elastic body is detected from information about the colored markers when a contact object touches the sensor, and the shape of the contact object calculated from strain information, and information about force acting on a contact interface (including both the elastic body surface and the contact object surface) are also detected. According to the present invention, it is possible to separately collect a plurality of types of information with a simple method called "color coding", and it is possible to acquire a plurality of types of tactile information at the same time with an optical system. According to the present invention an unknown number or more of independent observed values are collected using color coding, and it is possible to estimate and reconstruct force vectors by stably resolving a reverse problem.

The colored markers are photographed by imaging means, in a preferred example, a CCD camera, and image processing is carried out. For example, an image at the time of body contact and an image of a previous condition (a condition where external force is not acting on the transparent elastic body) are compared, and an amount of movement of the markers is detected. Alternatively, the markers are buried in the transparent elastic body in such an arrangement that they can not be recognized normally (in a state where external force is not acting on the transparent elastic body), and a configuration is such that markers are recognized in response to displacement deformation and inclination of markers caused by strain in the vicinity of positions where each of the markers exist when an object contacts the transparent elastic body, and information is detected from the appearance of the colored markers.

In one preferred embodiment, the imaging means is arranged at a position opposite to the side of the transparent elastic body contacted by the object. Also, in the case where there are a plurality of colored markers having different colors from each other, it is desirable to carry out convenient processing after imaging by selecting only markers of a particular color and looking at them separately. Selection of a particular color marker is carried out by, for example, using a color filter.

In one preferred embodiment, a plurality of groups of markers are embedded in the transparent elastic body, each group of markers being made up of a lot of markers, markers constituting different marker groups having different colors for each group, and the marker groups having a different spatial arrangement. As an example of this differing spatial arrangement, there are a plurality of marker groups arranged in a laminated manner inside the elastic body, or a plurality of marker groups arranged so as to intersect each other. In doing this, an acquired image is put in a state where particular information processing (for example, provision of a particular type of two dimensional information) has already been performed. These preferred embodiments will be described in detail later.

The shape of the colored markers is not particularly limited, and in an applied example can be spherical, cylindrical, columnar, strip shaped or flat, and the advantages of these shapes will be described in detail later.

PREFERRED MODE OF EMBODYING THE INVENTION

Figure 1:
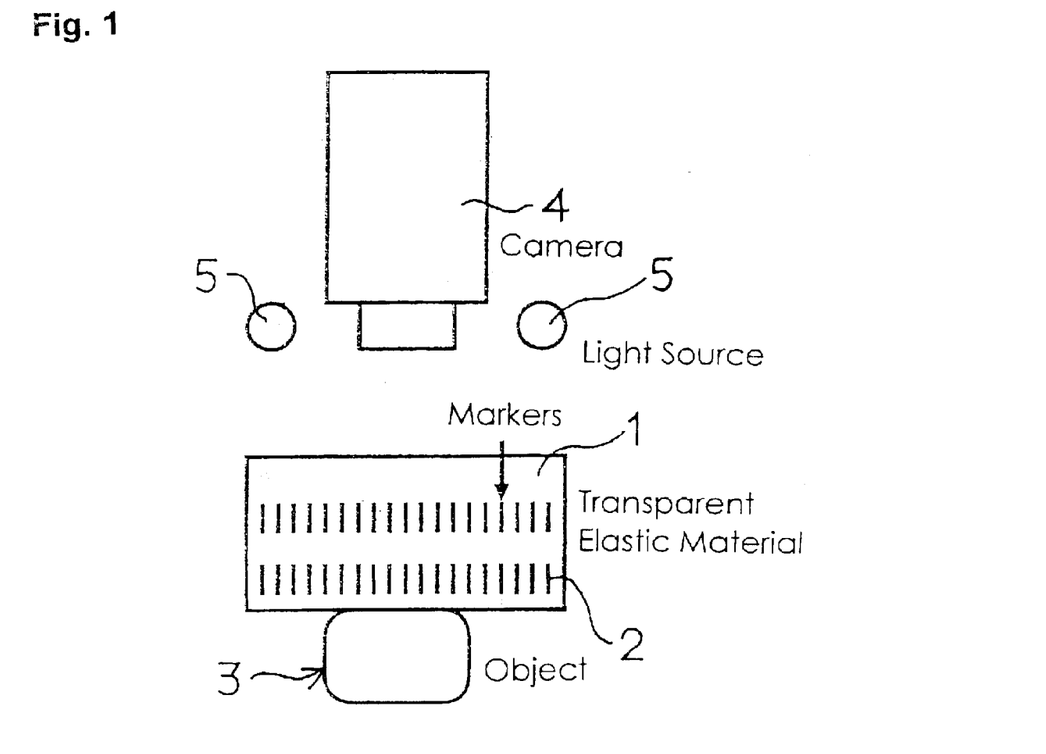
FIG. 1 is a drawing of the principle of a sensor of the present invention.

The basic structure of the present invention will now be described. FIG. 1 is a drawing of the principle of an optical tactile sensor of the present invention, the sensor comprising a transparent elastic body 1 formed of a transparent elastic material, with colored markers 2 embedded in the transparent elastic body 1 and a tactile section being constituted by the transparent elastic body 1 and the colored markers 2. The structure is such that if an object 3 comes into contact with the transparent elastic body 1, the colored markers 2 provided inside the transparent elastic body 1 are displaced or distorted. The sensor is also provided with a camera 4 as imaging means and a light source 5. The optical camera 4 is arranged at a position on an opposite side to where an object 3 touches so that the transparent elastic body 1 is interposed between the optical camera 4 and the object 3, and displacement or distortion of the markers 2 is photographed by the camera 4. The light source 5 may be guided using a waveguide (optical fiber).

The transparent elastic body 1 is preferably made of silicone rubber, but it can also be made from another elastic material such as another type of rubber or elastomer. The markers are preferably made from an elastic material, and more preferably made from the same material as the transparent elastic body 1, and in one preferred embodiment are formed by adding pigment to silicone rubber. Since deformation of the elastic body should not be inhibited by the markers, the markers are also preferably made from an elastic material (preferably having the same elastic constant as the elastic body). The material of the markers is not particularly limited as long as the extent to which deformation of the elastic body is inhibited is sufficiently small. It is also possible for a part of the elastic body to constitute the markers.

With the present invention, a plurality of optical markers are distributed within the transparent elastic body 1, and information about a contacting object and information about displacement and deformation within the elastic body produced by contact are detected by photographing situations where displacement, deformation and inclination arise in the markers due to deformation of the elastic body 1 as a result of the object coming into contact with the elastic body 1 using a camera.

A camera, as imaging means, is a digital camera, namely a camera for outputting image data as electrical signals, and in one preferred example is a CCD camera. It goes without saying that the imaging means of the present invention is not limited to a CCD camera, and it is also possible to use, for example, a digital camera using a C-MOS type image sensor. The fact that the colored markers are identified according to their color is one of the most important factors in increasing the intelligence of the sensor of the present invention, and it is desirable to mount color filters on the imaging elements. Even in the case where there are no color filters on the imaging elements (in this case, strength of light, specifically, only black and white images are taken), if only light sources of colors having a spectrum that is within the color spectrum reflected by the markers are prepared as light sources inside the sensor, since an image taken when each light source is shone contains only light radiated from the corresponding markers, it will function in the same way as color filters on the imaging elements. In the situations specifically described above, if three types of markers are prepared in red, green and blue, there are two methods of perceiving these three colors individually. (1) A method of separating using color filters (looking at RGB output from the camera in this case, each marker is individually photographed directly). (2) A method where imaging elements perceive only light intensity and light sources of red green and blue are prepared (When red is shone, light is only reflected from the red markers while the red light is absorbed by the markers of the other two colors, and so the camera effectively only perceives the red markers. If this is also carried out at separate times for green and blue, information equivalent to that using method (1) can be acquired.). The three colors red, blue and green mentioned here are only a example, and in actual fact the color spectrum is not limited and theoretically the colors of the markers (more precisely the spectrum of reflected light) can be selected from an infinite number of colors as long as they are independent from each other.

In a typical embodiment of the present invention, giving markers a plurality of different colors allows the photographed image to have information for a plurality of degrees of freedom. The examples described in the following convert displacement and shear strain in the vicinity of position where the markers exist to image information.

The present invention is characterized by the fact that colored markers are used, but the present invention can be broadly divided into two features. Firstly, the design of the markers themselves is not particularly inventive, but strain information is acquired for the elastic body by processing an acquired image on a PC, which is referred as image processing, and this is equivalent to the first embodiment described later. Secondly, the markers themselves are endowed with intelligence and an acquired image already constitutes elastic body information, which is referred as an intelligent material method, and this is equivalent to the second, third, fourth and fifth embodiments described later.

First Embodiment

Figure 2:
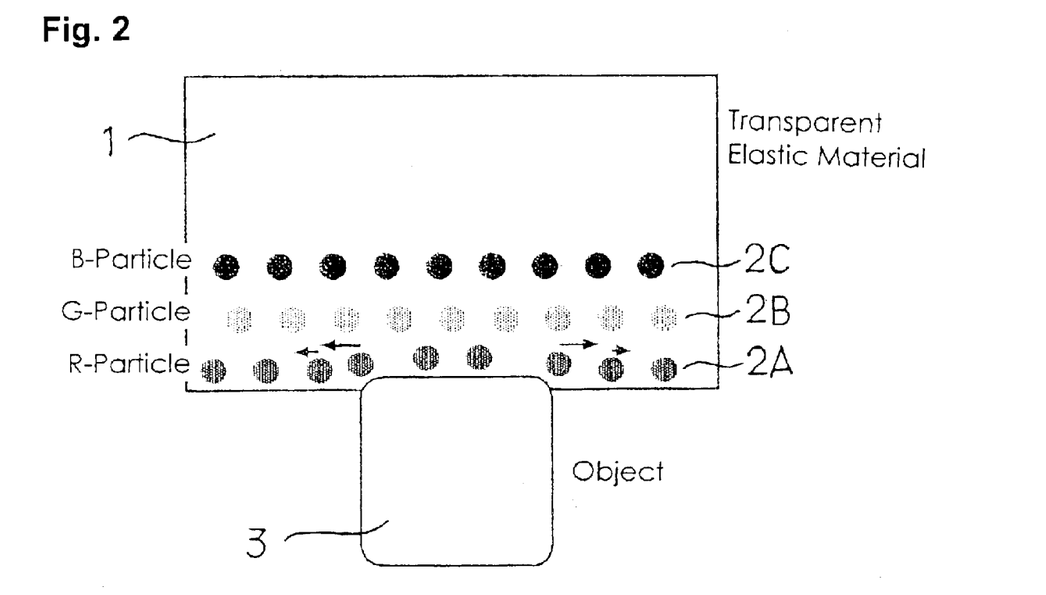
FIG. 2 is a drawing of the principle of a sensor of a first embodiment.

The first embodiment has spherical markers arranged in a depth direction. As shown in FIG. 2, microscopic colored spherical particles are used as the markers, and these are distributed separately in a plurality of layers according to color. For example, if they are divided into RGB (red, green and blue), these are simple to perceive by separating for each layer using color filters of a camera. With the arrangement shown in the drawing, a marker group 2A made up of red microscopic spherical markers is embedded in the shallowest section (the side distance from the camera) from a surface of the transparent elastic body 1 that an object 3 comes into contact with, a marker group 2B made up of green microscopic spherical markers is embedded in a section that is deeper than the layer marker group 2A is embedded in, and a marker group 2C made up of blue microscopic spherical markers is embedded in a section that is deeper than the layer marker group 2B is embedded in (the side close to the camera). In FIG. 2, although not shown in the drawing, the camera is arranged so as to face towards a surface opposite a surface touched by the object 3.

The spherical markers forming each layer are preferably not overlapped with each other in the layer direction (in the drawings, a direction from top to bottom), and in this embodiment for example spherical markers making up each layer are randomly distributed at a certain density. Since there are images with extremely small spatial autocorrelation if the markers are positioned in a disordered manner (binarized so-called white noise images), for respective images it is possible to compare images when an object touches and images before the object touches to obtain amount of pixel movement for each point. Specifically, correlation computation is performed for images taken in advance and images taken after contact, and movement vectors for each point are detected. In order to do this, the markers are preferably of such a size that they can be arranged from 1×1 to not greater than 10×10 camera pixels.

By providing colored markers of different color at differing depths of the elastic body, it is made possible to measure amount of horizontal movement at separate depths. Also, the density at which markers exist in each layer is preferably made smaller approaching the upper layer (a side furthest from a surface touched by an object), that is, approaching the camera. The reason for this is that firstly markers in the upper layer tend to hide markers of the lower layers, which is not preferred from an image processing viewpoint, and secondly, as there is greater separation from the contact surface moving towards the upper layers, spatial frequency of displacement is lowered, and in order to calculate this a high density of markers is not required.

It is preferable to use a camera ranging from a pin hole camera handling focal points at all depths to a deep focal point depth camera, but in the case of using a camera with a lens of shallow focal point depth, it is better to focus on the lowest layer. The reason for this is that as described previously displacement of the upper layer has low spatial frequency and in order to perceive this displacement, high resolution is not required, and even if there is focus at the lowest layer, fuzziness at layers above does not have any effect on the image processing.

Figure 11:
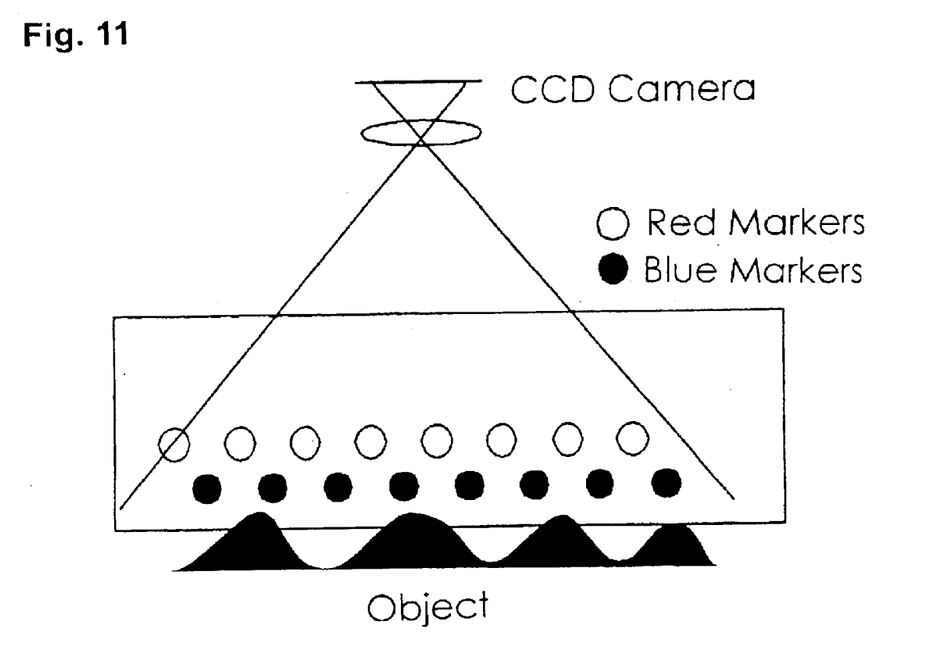
FIG. 11 is a drawing showing an optical tactile sensor using movement measurement of markers.

Reconstruction of force vectors by movement of markers and the effects of this in a sensor provided with the two layer marker group shown in FIG. 11 will now be described. A plurality of small colored spheres (markers) are embedded inside an elastic body, a movement at each point is measured by photographing with a CCD camera. Movement measured at this time is horizontal movement, and therefore has two components, namely x and y. Accordingly, information for two degrees of freedom are obtained from each marker. It is possible to ultimately obtain surface distribution of the movement vectors. As described previously, since the force vectors have three components at each point, it is insufficient to reconstruct the force vectors with a sensor for only two components for each point on the surface, as described above. However, if the markers are prepared for one more layer as shown in FIG. 11, it is possible to acquire distribution for another group of movement vectors. Since it is ultimately possible to independently detect four movement components for each point, it is possible to reconstruct ternary surface force vector distribution. By making the marker groups embedded in separate layers respectively different colors (here they are red and blue), each marker group is separated from a taken image and it is possible to separately calculate respective movement vectors. The markers can be microscopic white noise or spheres with a diameter of a few millimeters. In a current prototype, the markers used have a diameter of about 1 mm, and for this reason there was a problem that markers of the lower layer were shielded by markers of the upper layer. In order to avoid this, the markers of each layer were arranged at positions that do not overlap each other.

Figure 12:
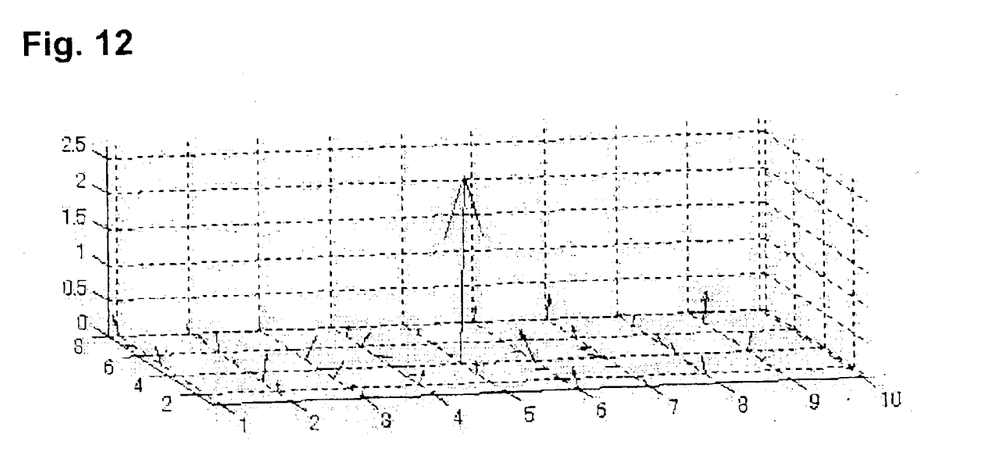
FIG. 12 is a drawing showing reconstructed force vector distribution for the case where a single point has been pressed vertically.
Figure 13:
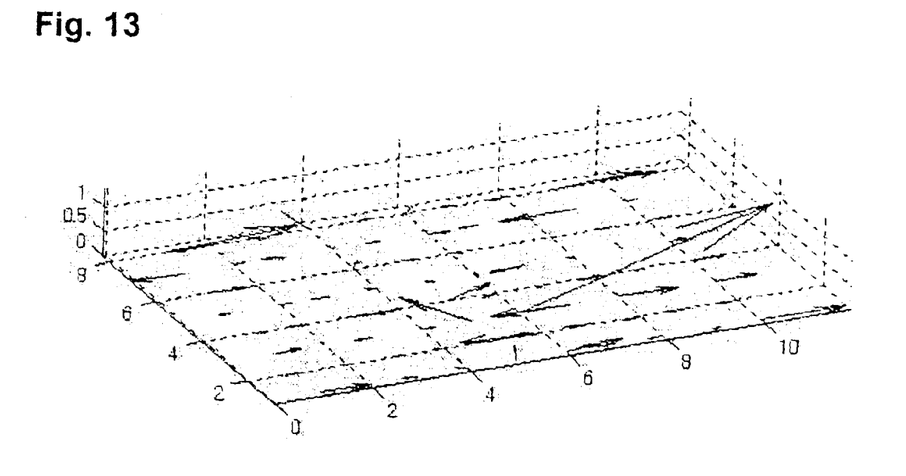
FIG. 13 is a drawing showing reconstructed force vector distribution for the case where a single point has been pressed horizontally.
Figure 14:
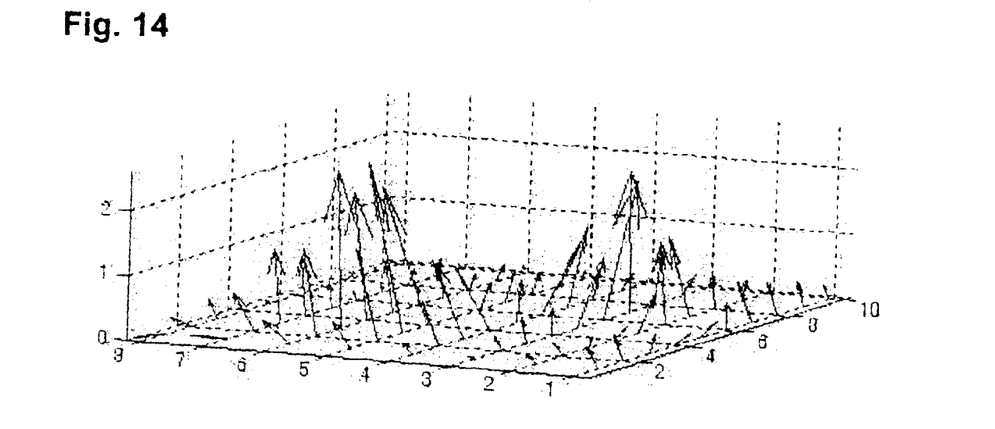
FIG. 14 is a drawing showing reconstructed force vector distribution for the case where two points have been pressed.

FIG. 12 to FIG. 14 are force vectors reconstructed as the results of an experiment. FIG. 12 is for the case of pressing vertically at one point in the center of a contact surface, and FIG. 13 is for the case of pressing horizontally at the same point. From these two results, it is understood that reconstruction is possible for at least force vectors acting at one point. FIG. 14 is for a case where two points of the contact surface are pressed, and it will be understood from these results that distribution of forces contacting the surface are being reconstructed. This system has a simple theory and can be manufactured easily, but because the images as they are do not constitute tactile information, it is necessary to obtain horizontal movement vectors from the images by calculation. However, with the advance in computers in recent years the problem of computing load has been substantially resolved, and in the example actually described the time taken to obtain force vector distribution from taking the image was less than 100 ms (using a Pentium III® 800 MHz PC), and this time is substantially proportional to the area of the contact surface in question.

One preferred manufacturing process for the sensor of the first embodiment will now be described.

Figure 3:
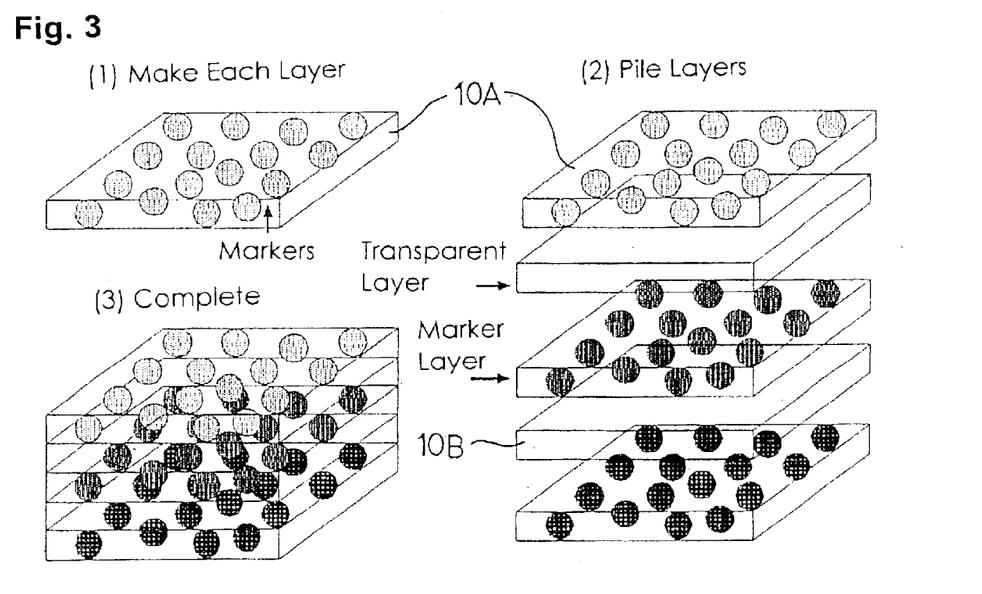
FIG. 3 is a drawing showing a manufacturing process for a sensor of the first embodiment.

(1) First of all, each of the layers mixed with colored microscopic spheres is made. In this case, in order to prevent the markers having any effect on deformation of the sensor body, they are preferably made by adding pigment to an elastic body that is the same as the main body, but it is also possible to make the markers from a different material having the same elastic properties. Also, any material can be used as long as the size of the markers is sufficiently small for it to be determined that it is possible to disregard any effects on deformation of a sensor body. The shape of the markers is spherical, and the thickness of the layers made at this time is preferably substantially the same as the diameter of the markers. In this way, it is ensured that the same color markers exist at the same depth. (2) Next, each marker layer 10A (single elastic body having markers distributed) and a transparent layer 10B (single elastic body with no markers) are laminated. In the event that the elastic body itself is self-adhesive, it is possible to use the transparent layer as an adhesive material, but it is also possible to carry out lamination using a transparent adhesive that has little effect on separate elastic bodies. In the drawings, three marker layers 10A are shown, but as described above, the density of marker distribution becomes higher going from the upper layer to the lower layer (that is, going from a side that is close to the camera to a side that is far away from the camera). The size of markers described from now on will be governed by the required resolution for all applications. As an example of applications, it is possible to consider a case of using as a tactile sensor for a robotic hand, and the diameter of spherical markers in one such example is from 0.1 mm to 0.2 mm.

Second Embodiment

A second embodiment of the present invention will now be described based on FIG. 4 and FIG. 5. With the second embodiment, markers are extremely thin cylinders or columns having microscopic cross sections and in the drawings the markers are embedded vertically inside a transparent elastic body. The markers extend along imaginary lines connecting an object coming into contact with the elastic body and a camera. A marker group is formed in an elastic body 2 by providing a large number of markers in rows at a specified depth, with markers being provided in three stages at differing depths. In the drawings, a marker group 20A made up of extremely thin red cylindrical markers is embedded in the shallowest section from a surface of the elastic body 1 that an object 3 comes into contact with, a marker group 20B made up of extremely thin green cylindrical markers is embedded in a section that is deeper than the layer marker group 20A is embedded in, and a marker group 20C made up of extremely thin blue cylindrical markers is embedded in a section that is deeper than the section the layer marker group 20B is embedded in.

Figure 4:
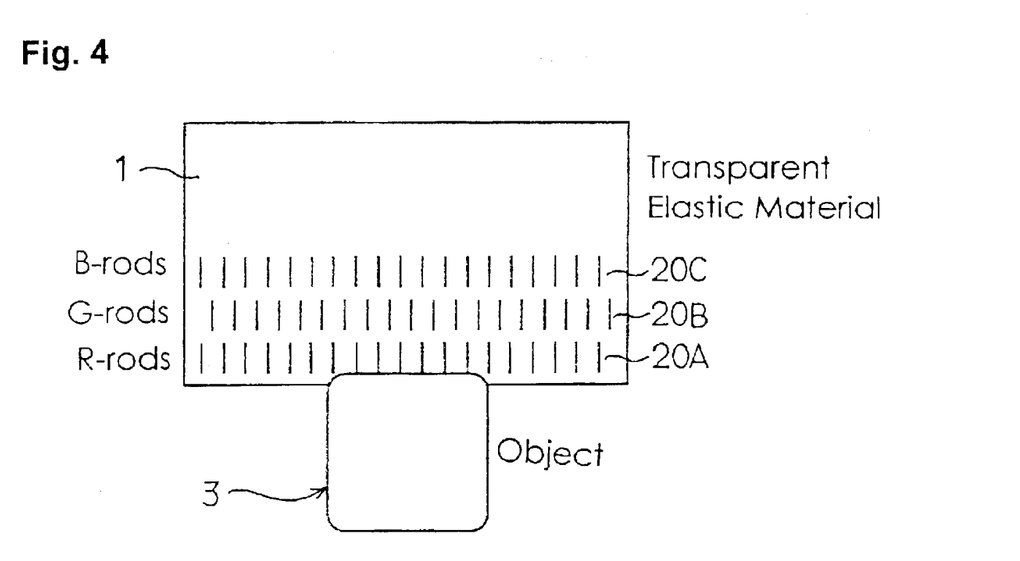
FIG. 4 is a drawing of the principle of a sensor of a second embodiment.
Figure 5:
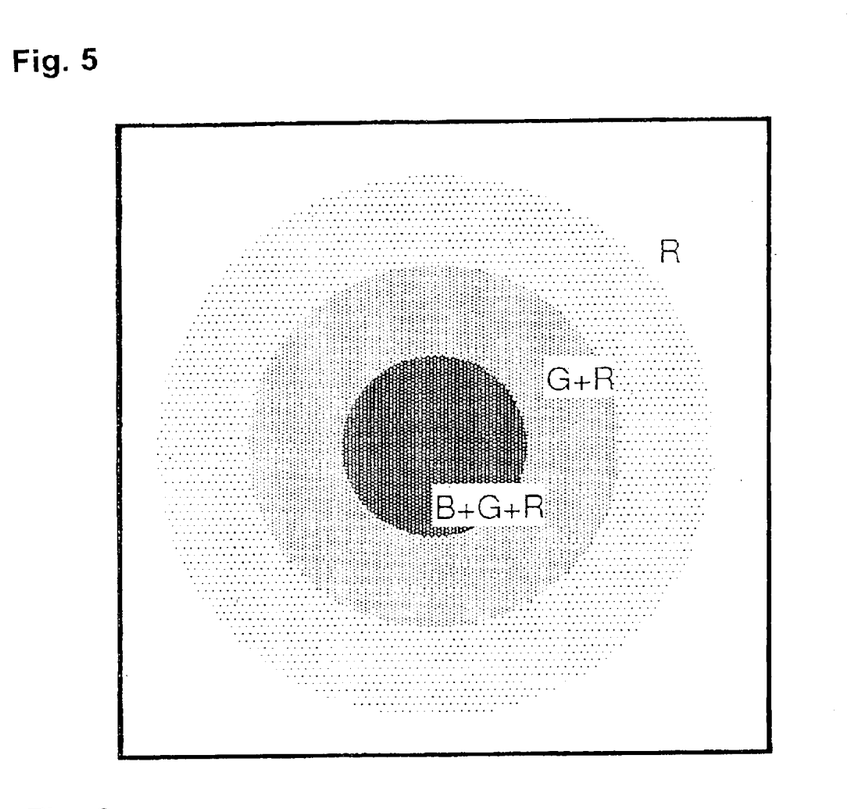
FIG. 5 is a drawing showing an example of an image acquired at the time of contact in the sensor of the second embodiment.

In FIG. 4, the camera is not shown, but the camera is arranged so as to face towards a surface opposite to the surface touched by an object 3. In this way, the three stage marker groups are color-coded into respectively different colors, and in the drawing they are color-coded blue green and red, but the marker colors are not limited to this and as long as they can be identified by the camera the markers can be any color. Each of the markers constituting the marker groups 20A, 20B and 20C embedded in each layer preferably do not overlap each other in between each layer (in the up down direction).

Each marker constituting the marker groups has a microscopic cross section, which means that usually it is not possible to see anything when looking from the camera arranged at the upper side in the drawing. If shear strain is caused at the marker position due to contact with an object, the markers will be at an inclination proportional to the shear strain and it will suddenly be possible to see color in the transparent elastic body when viewed from above.

With this embodiment, because the marker groups are aligned in a color-coded manner in the depth direction, the colors observed correspond to the shear strain at that depth. Ideally, for example, in the case where an object is simply pressed against the elastic body, a rainbow pattern (FIG. 5) is observed with the contact point as the center. This represents only shear strain variation corresponding to depth, and it is possible, for example, as will be described in the following, to separate vertical direction components and horizontal direction components of stress acting on the contact surface and respectively measure them. With a conventional tactile sensor, stress at the contact surface is only calculated on the assumption that it only acts in the vertical direction, but with this sensor since attenuation of shear strain conveyed in the depth direction of the elastic body differs for vertical stress and horizontal stress it is possible to separate and detect the two types of stress by looking at variation of shear strain in the depth direction.

Also, in the case where the contact surface is vibrating, nodes and antinodes of vibration arise inside the elastic body depending on the mode of the vibration (such as building vibration). At this time, markers at the node sections are subjected to the maximum shear strain and so there is large inclination. Accordingly, by looking at an image it becomes possible to detect the vibration mode of the inside of the elastic body and also the frequency of the vibration.

Figure 6:
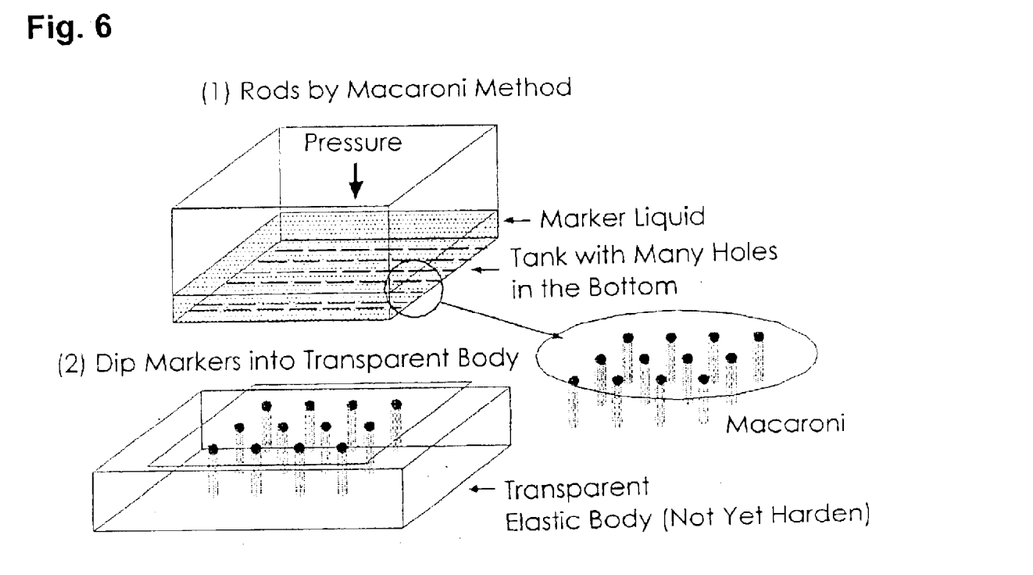
FIG. 6 is a drawing showing a manufacturing process for a sensor of the second embodiment.

A manufacturing process for the sensor of the second embodiment will now be described. FIG. 6 is one example of a manufacturing process for the sensor. First of all, a stock solution of colored markers is put into a container having a lot microscopic holes at the bottom, and high aspect ratio cylinders are formed by extruding before the solution sets. The cross-sectional diameter of the extremely fine markers is 0.1 mm 0.5 mm in one example, and the length is from about 10 times to 100 times the diameter, in one example. This is placed in a transparent elastic body stock solution before setting. These process can be integrated and the colored markers extruded into the transparent elastic body stock solution. Also, after the solution has set, it is sliced to an appropriate thickness. This is done for each differently colored marker and a sensor is formed by laminating into a multilayer structure.

Third Embodiment

Figure 7:
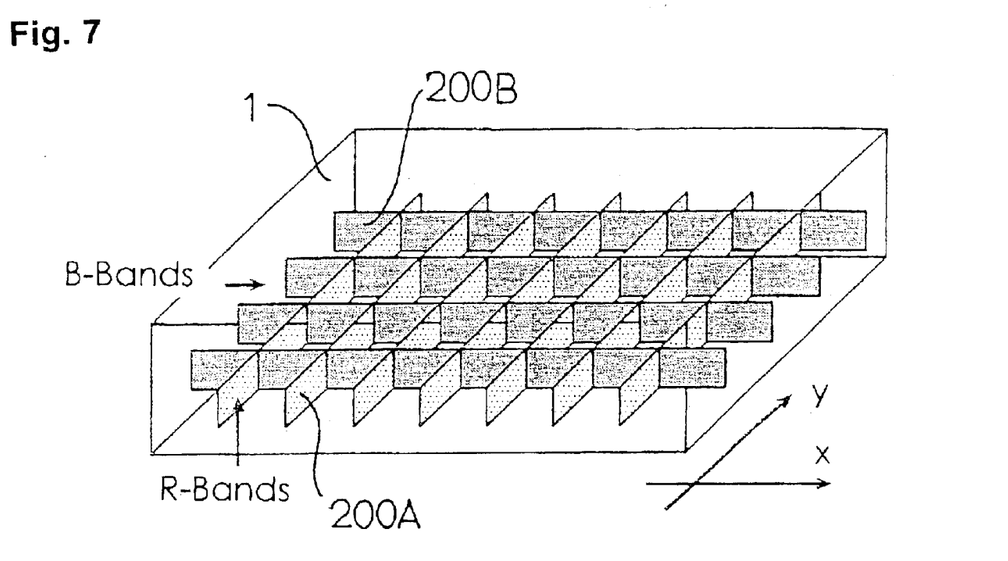
FIG. 7 is a drawing of the principle of a sensor of a third embodiment.

A third embodiment of the present invention will now be described based on FIG. 7. Extremely thin strips are used as the markers (for example, about 0.001 mm), and a large number of strips are aligned in parallel to constitute a marker group. Also, other color codes marker groups are aligned at a different angle to the first marker group. In the drawing, as one preferred aspect, two marker groups 200A (marker group comprising a plurality of thin red strips arranged in a row) and 200B (marker group comprising a plurality of thin blue strips arranged in a row) are aligned so that respective markers are orthogonal to each other, but the spatial arrangement relationship between the plurality of marker groups is not limited. It is also possible for the two sides of the strips constituting the marker to have different colors.

The strip shaped markers are embedded inside a rectangular parallelepiped shaped transparent elastic body 1 having a specified thickness. The strip shaped markers extend perpendicular to a surface of the elastic body 1 touched by an object and a camera is arranged so as to face towards a surface that is opposite the surface touched by the object 3. Because the strip markers are extremely thin, it is not normally possible to see anything when looking from above (from the camera). If shear strain arises at marker positions due to contact with an object, the markers are inclined to an extent proportional to the strain and it suddenly becomes possible to see the colors in the transparent elastic body, similarly to the first embodiment.

Also, since the markers are aligned in different directions in a color-coded manner, a color that appears already contains strain direction component information. For example, with the example in the drawing when there is warping in the x direction red appears, and section where warping occurs at 90 degree to that appear as blue. At a number of places it is possible to see intermediate colors that are a mixture of the colors used, and if R and B of the camera RGB output are seen this directly constitutes X and Y components of shear strain. In a holding task (carrying a held object without dropping it) which is an essential basic operation for a robot hand, it is possible to estimate frictional force being produced on a contact surface by seeing what direction shear strain is acting in, making it possible to anticipate application in that direction.

It is also possible to consider observation not from directly overhead but from a slightly inclined position. In this case, colors will be observed from the beginning because the colored layers are inclined. A zero point (state where colored layers are vertical and there is no color) is avoided by an offset that is provided by the inclination. Specifically, since only the one side of the colored layers is observed, it is not necessary to have different colors on the front and rear sides. The structure shown in FIG. 7 can also be laminated to form a sensor.

Figure 8:
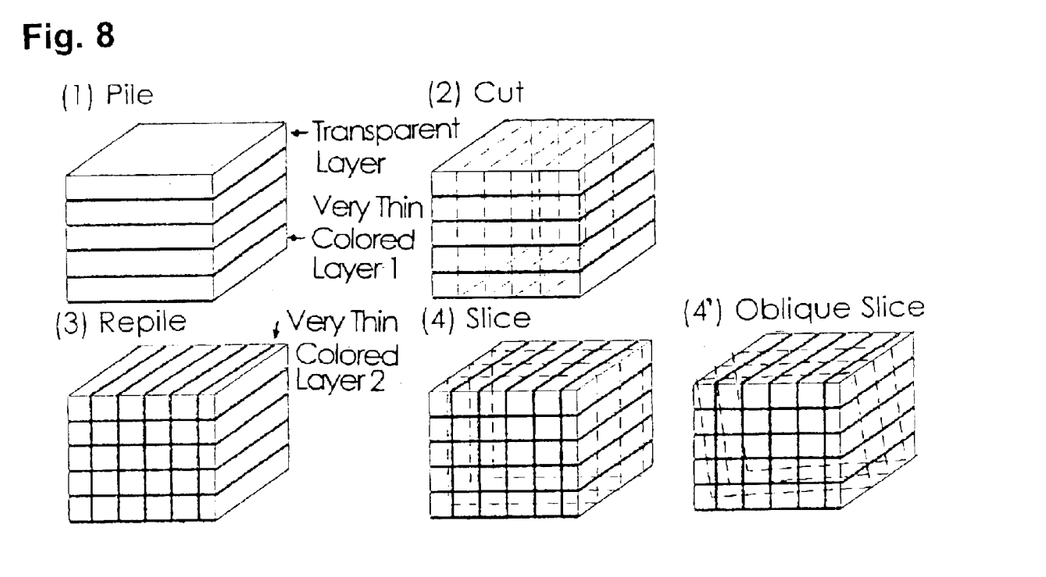
FIG. 8 is a drawing showing a manufacturing process for a sensor of the third embodiment.

FIG. 8 is one example of a method of manufacturing the sensor of the third embodiment. (1) A transparent elastic body and a colored elastic body are laminated. At the prototype stage, respective thicknesses were 1 mm for the transparent elastic body and 0.01 mm for the colored layers, but in order to apply the sensor to a robotic hand or the like preferred thicknesses are 0.1 mm for the transparent elastic body and 0.001 mm for the colored layers. (2). The laminated body obtained in (1) is cut up in the direction perpendicular to the laminated direction. The cutting thickness is preferably the same as the thickness of the transparent elastic body described previously. (3) Each cut strip is bonded by interposing an elastic body between them that is a different color from the colored elastic body of (1). Since silicone rubber has self adhesion, if this is used the bonding step is simple, but it is also possible to use a special adhesive layer. (4) The laminated body from (3) is cut off along a surface orthogonal to the two orthogonal layers (two elastic bodies having different colors mentioned above). The cut off thickness depends on the use or the hardness of the elastic body, but if the distance between the laminated colored layers is taken as 1, the cutting thickness can be considered to be from 1–20. In the previous manufacturing step (4), it is also possible to cut off at an angle, as shown in (4'). In this case, when being used as shown in FIG. 7, if observation is carried out from directly overhead it is possible to observe color because from the start colored layers are already inclined. That is, an offset is set in order to avoid a zero point (a state where the colored layers are vertical and there is no color at all) and it is therefore not necessary to provide separate colors on the two sides of the colored layers.

Fourth Embodiment

Figure 15:
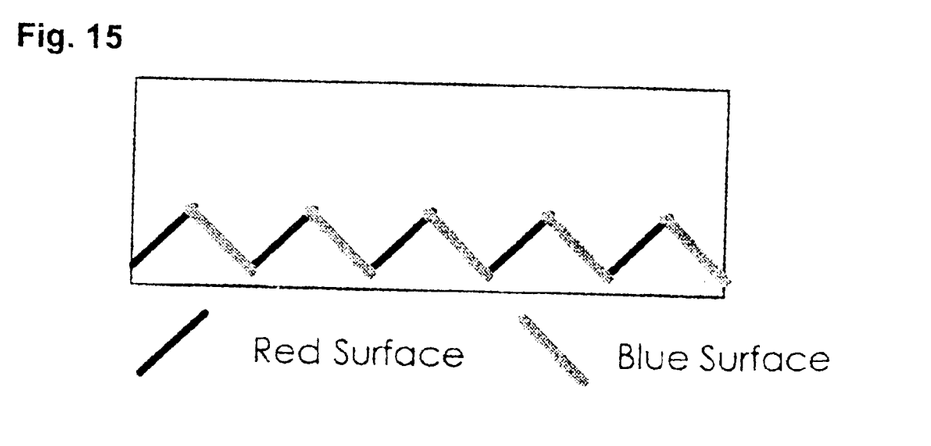
FIG. 15 is a drawing of a stepping method of a fourth embodiment, looking from the side.
Figure 16:
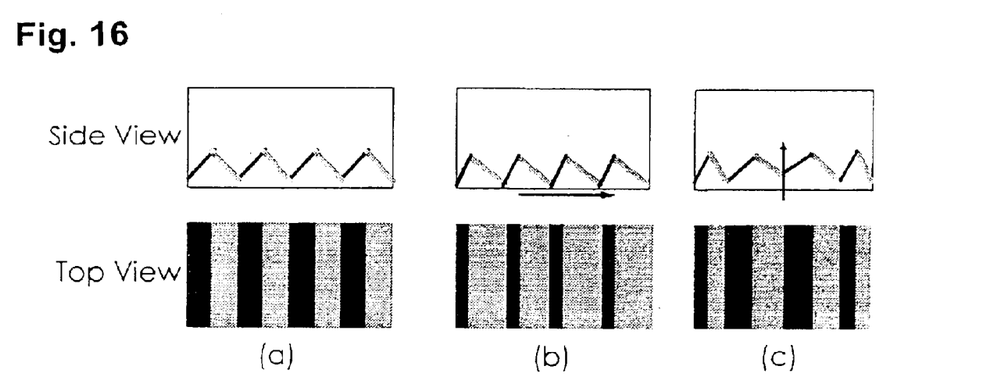
FIG. 16 shows images acquired by observation from an upper surface of the elastic body shown in FIG. 15, with FIG. 16(a) showing normal conditions, FIG. 16(b) showing the case where horizontal force has been applied to a contact surface, and FIG. 16(c) showing the case where vertical force has been applied to the contact surface.
Figure 17:
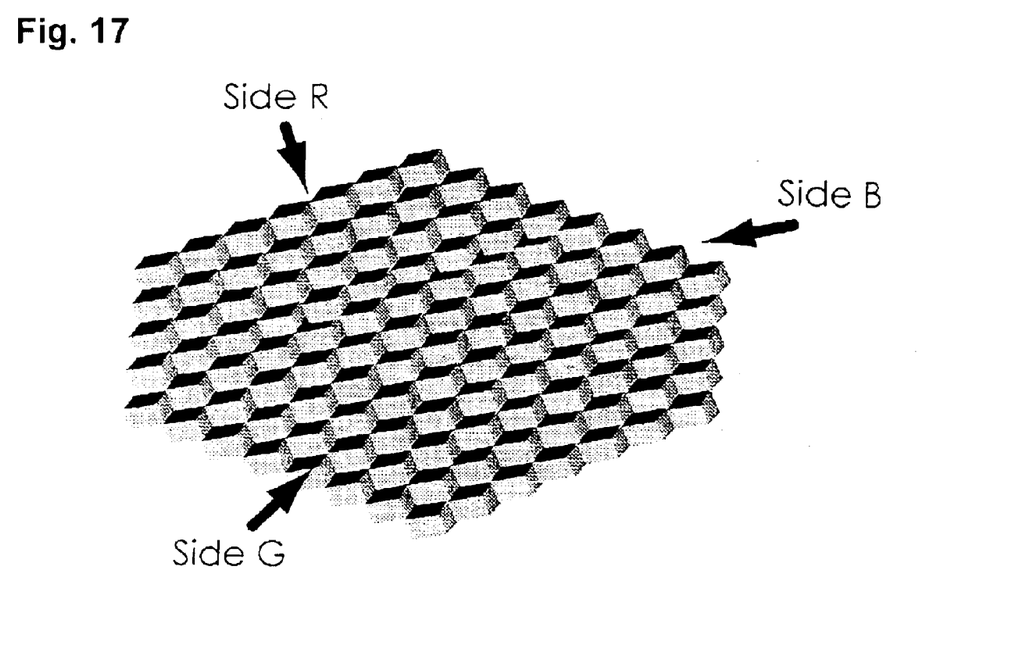
FIG. 17 shows a pyramid shaped bottom surface, with three groups of surface facing in the same direction colored red, green and blue, respectively, each color being combined, when observed from above, to give white.

The fourth embodiment is an improvement to the third embodiment. The biggest problem when the strips are aligned is that that manufacturing step is difficult. A method of simplifying the manufacture while maintaining the same sensor capability is the so-called step method, as described in the following. As shown in FIG. 15, a step-shaped interface is prepared (parts of the elastic body constitute the markers). Because of the stepped shape, the interface can be divided into two surface groups, all surfaces in a group having the same direction. The surfaces in each group are made the same color (here they are red and blue). In doing this, an image taken from above becomes as shown in FIG. 16. If the width of each strip is sufficiently thinner than one pixel on an imaging element the colors of two strips are mixed together and observed as an image of a single color. If the sensor body is touched, the respective inclination of the strips varies, but this is observed as a variation in color. In the case where horizontal force is applied to the contact surface (FIG. 16(b)), each strip is subjected to rotational movement at respective locations, and as a result, on an image taken from above, one of the surface groups is seen to be compressed while the other surface group is seen to be expanded. Specifically, it is observed as a variation of the ratio of the two colors. Also, if a vertical force is applied to the contact surface (FIG. 16(c)), the inclination of the strips is similarly altered, but there is no variation in the ratio of the two colors but a variation in the brightness of the image. Specifically, since the "difference" and "sum" of brightness for each color being observed (red and blue) varies due to force components in the horizontal direction and the vertical direction, it is possible to acquire observation values containing vertical and horizontal components of force vectors at a particular point as information by observation of brightness of the two colors at that point. By sensing the observation values, it is possible to reconstruct surface distribution of force vectors. This system can be said to be the same as the previously described strip type sensor in that surface inclination plays a fundamental role, but it has the advantage from a manufacturing viewpoint that compared to the strips, the step-shaped surfaces can be made in a single process by filling silicone undiluted into a die. Also, in order to simplify the description, a method using two colors has been described, but as shown in FIG. 17, using so called pyramid manufacturing where microscopic cubes are gathered at a bottom surface, if three groups of surfaces facing in the same direction are respectively made the same color (for example, red, green and blue), then similarly to the previous discussion it is possible to respectively obtain two degrees of freedom for force acting in a horizontal direction on a contact surface as brightness ratios for three colors, and force acting in a vertical direction using a total brightness of the three colors.

Figure 18:
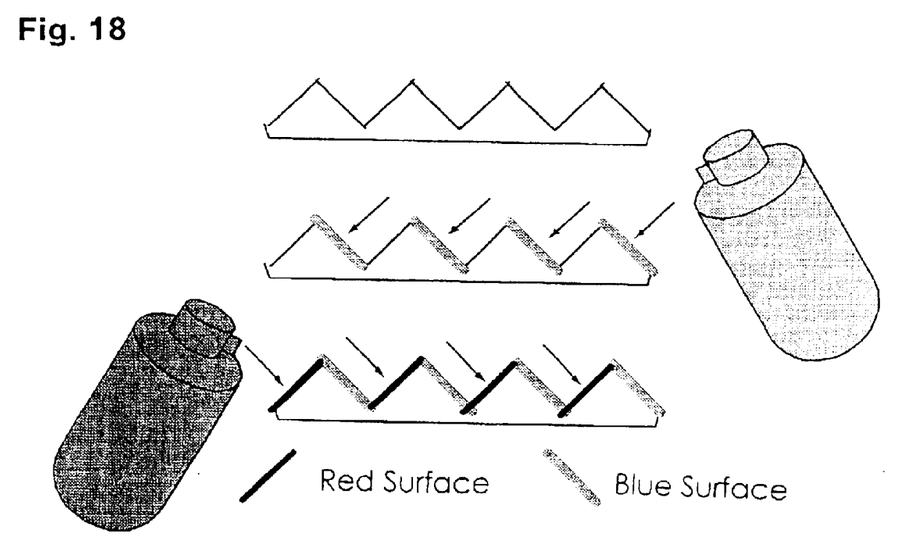
FIG. 18 is a drawing showing coloring of each separately inclined surface.
Figure 19:
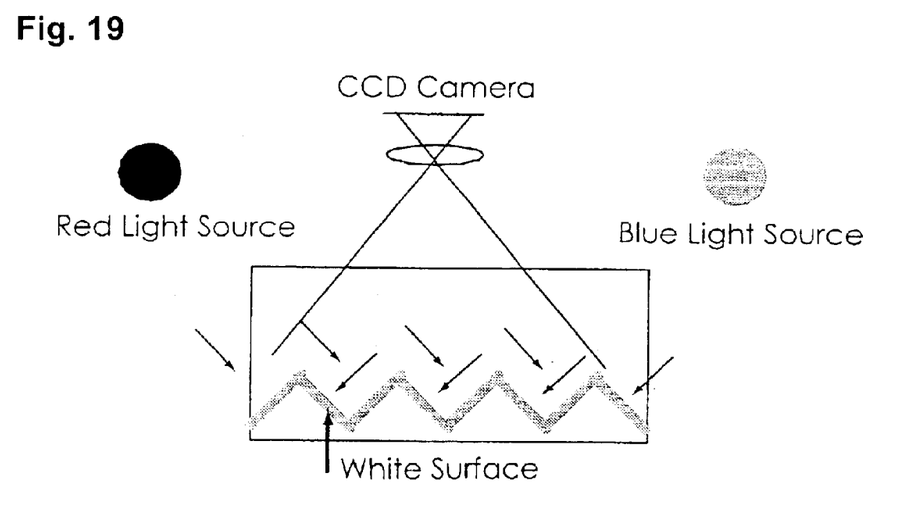
FIG. 19 is a drawing showing the case where light scattered from a white surface is observed using a directional light source.

A marker coloring method and use of light sources will now be described. In coloring each surface group having different inclination as shown in FIG. 15 and FIG. 17, it is possible to spray paint from a direction perpendicular to each surface, as shown in FIG. 18. However, as each surface becomes smaller and smaller, coloring using this method is particularly difficult as the size of the particles contained in the paint approaches the size of the surfaces. Two methods can be considered to overcome this difficulty. First of all, photosensitive material that takes on color due to light is coated on the stepped surface, and a surface is selectively exposed at that inclination using horizontal light from a direction vertical to each surface. This method is already being used in microfabrication on silicon wafers. An other simpler method involves forming each surface as a totally white scattering surface, irradiating each color of light to be used as a sensor from directions perpendicular to each surface, and observing dispersed reflected light (FIG. 19). Using this method, since it is possible from the start to color the silicone undiluted white when forming the stepped surfaces, the manufacturing process is made extremely simple, crosstalk between each color channel is reduced by adjusting a light amount of each light source during use as a sensor, and higher precision sensing is achieved.

The essence of the stepped method is that rotational movement of each point of the stepped section corresponds to a difference in brightness of each color, while compression in the vertical direction corresponds to average inclination of each surface, namely to a sum of the brightness of each color, but there is a problem that sensitivity for upward and downward compression is low compared to that for rotational movement. However, it is possible to improve sensitivity to upward and downward displacement with the following few modifications.

Figure 20:
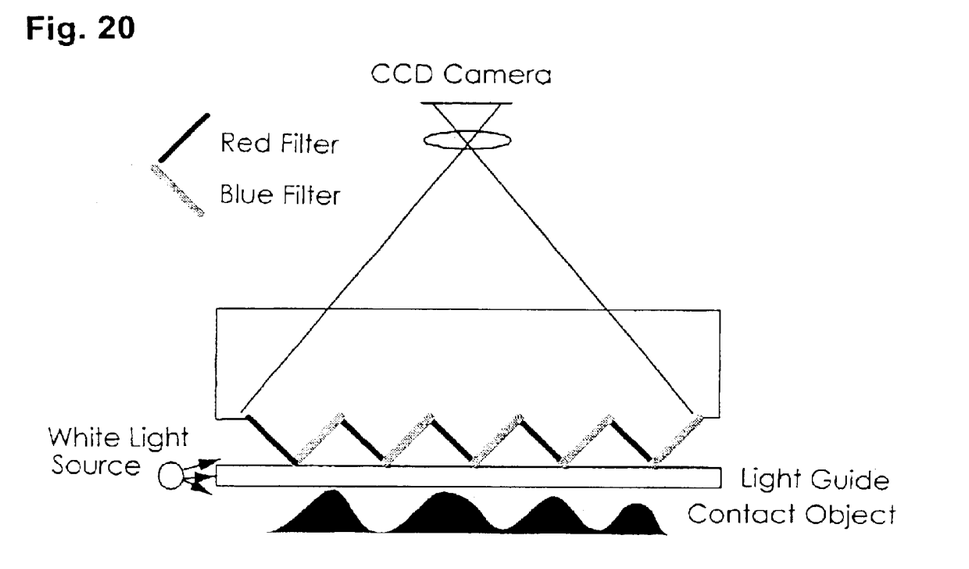
FIG. 20 is a drawing showing a sensor having a combination of stepped type optical tactile sensors and light guide films.

In FIG. 20, a light guide is a film made from the same material as the sensor body or somewhat hard transparent elastic body, and has a thickness of 0.5 mm–1 mm. White light from a white light source is led to this light guide, light floods in to the inside of the light guide due to the principle of total reflectance exactly the same as an optical fiber, and it is possible to create a state where no light leaks out. At this time, in each stepped surface of the stepped type transparent elastic body described above, a transparent elastic member making up a color filter that only allows red and blue to pass is arranged on the light guide with a stepped surface downwards. This color filter can be formed using the same process as for the colored surface described previously. This sensor system comes into contact with an object through the light guide. When there is no contact, there is also no contact between the light guide and the stepped surface, and the camera image remains dark. However, if contact between the light guide and the vertex of the stepped surface starts because of contact with a contact object, white light filled inside the light guide passes through the color filter of the stepped surface and is imaged as colored light.

Figure 21:
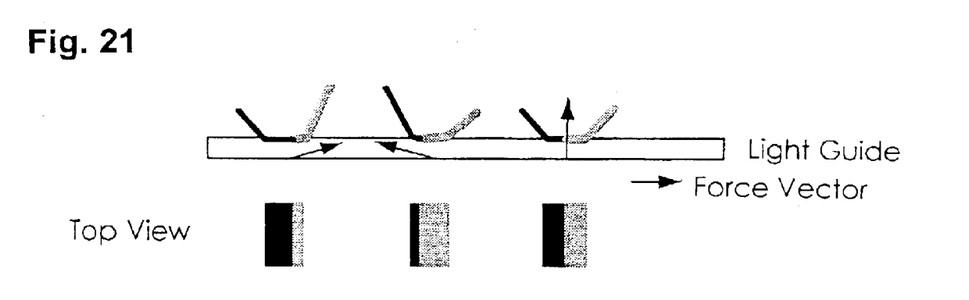
FIG. 21 is a drawing showing change in contact between a stepped surface and the waveguide as a result of force exerted on the waveguide as changes in the observed image.

FIG. 21 shows this state. Depending on the direction of force vector distribution acting on the light guide surface, the contact state between the stepped surface and the light guide varies. In the case of vertically acting force (right side of FIG. 21), since the vertex of the step is deformed with left right symmetry, an image is obtained with red and blue mixed to the same extent. The brightness of the image at this time represents vertical resistance. Also, in the case of force acting close to the horizontal, the step is deformed sideways, and asymmetry arises in the contact between the light guide and each surface of the stepped surfaces. This asymmetry, namely a ratio of red to blue, indicates force in the horizontal direction.

The fact that a difference and sum of brightness for each color channel are sensing objects is the same as described previously, but compared to the previously described case, in this case there are two advantages as described in the following. First, sensitivity to force acting in the vertical direction is improved significantly. Second, compared to the previously described sensor, where an image is obtained that has a certain brightness from an initial non-contact state, meaning that the dynamic range as a sensor up until saturation of the camera elements (ratio of the maximum signal to a minimum signal that can be processed by the device) is narrow, which is linked to degradation in precision of a tactile sensor, since the sensor of this embodiment normally has a dark image in an initial state when there is no contact, there is the advantage that the dynamic range of the CCD camera pixels themselves can be sufficiently exploited.

Fifth Embodiment

Figure 9:
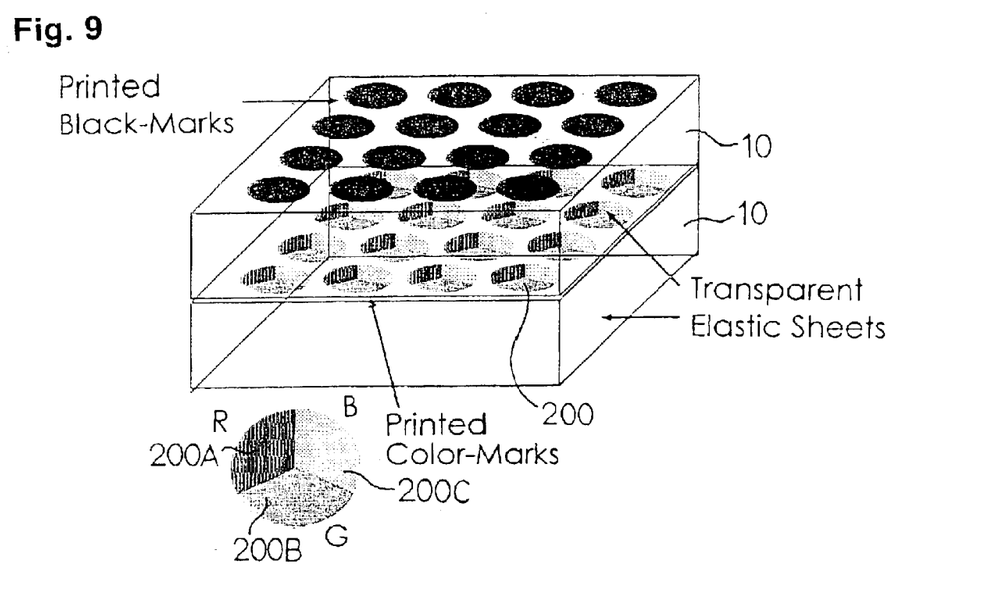
FIG. 9 is a drawing of the principle of a sensor of a fifth embodiment.

A fourth embodiment will now be described. With this embodiment, stereoscopic markers are not formed, and instead markers are printed on the surface of the transparent elastic body, and these are accurately overlapped and bonded. In FIG. 9, two overlapping stages are shown, but the number of stages is not limited to two stages and any number of stages is possible.

The sensor is formed by laminating unitary elastic bodies 10 having a rectangular parallelepiped shape and a specified thickness. With the sensor shown in the drawing, an object is contacted from below and photographed from above by a camera, and the object contacts a lower surface of the lower layer unitary elastic body 10. A plurality of completely round planar markers 200 are provided on the upper surface of the lower layer unitary elastic body. With the sensor shown in the drawing, the circular markers 200 are divided into three from the center of the circle to separate them into three fan-shaped sections 200A, 200B and 200C, and each section is coated with a different color, in this embodiment red, green and blue. The shape of the markers is not limited to being round, and the number of colors coated on is not limited to three, and two colors or four or more colors are also possible. The diameter of the planar markers is 1 mm–2 mm in one example.

Black concealment markers 6 having the same size and the same shape as the circular markers 20 are provided on the upper surface of the upper layer unitary elastic body 10, and when looking from the camera (from above) the concealment markers 6 completely overlap the circular markers 20 and the upper and lower single elastic bodies 10 are then laminated and bonded.

Usually, the lower layer colored markers 20 are shielded by the upper layer concealment markers 6 and can not be seen, but if when shear strain arises, the positions of the concealment markers 6 and the colored markers 20 become offset, giving color. With the sensor in the drawing, the markers are coated with three colors RGB, and it is possible to ascertain the strain direction from the color produced.

Industrial Applicability

The present invention can be widely applied to tactile sensors, and as an applied example can be used in a tactile sensor for a robot hand.

What is claimed is:

1. An optical tactile sensor having a tactile portion and imaging device, said tactile portion comprising a transparent elastic body and a plurality of marker groups provided in said body, each marker group being comprised of a number of colored markers, with markers constituting different marker groups having different colors for each group, and behavior of colored markers being photographed by said imaging device when said elastic body is contacted by an object.

2. The sensor of claim 1, wherein said behavior of the markers comprises at least one of displacement, strain and inclination of the markers.

3. The sensor of claim 1, wherein said marker groups have different spatial arrangements from each other.

4. The sensor of claim 3, wherein said marker groups are laminated in the elastic body.

5. The sensor of claim 3, wherein said marker groups intersect each other in the elastic body.

6. The sensor of claim 4, wherein the markers constituting the marker groups are microscopic spherical particles and the spherical markers constituting the marker group for each layer have different colors from each other.

7. The sensor of claim 6, wherein said imaging device is arranged at a position opposite to a surface touched by the object, the layers are laminated away from said surface in said transparent elastic body, and the distribution density of markers for each marker group is made smaller away from the surface.

8. The sensor of claim 4, wherein the markers constituting the marker groups are extremely thin cylindrical or columnar bodies having microscopic cross sections, a number of markers are aligned in parallel to form each marker group, and the extremely thin markers constituting the marker group for each layer have different colors from each other.

9. The sensor of claim 8, wherein said extremely thin markers extend along an observation direction.

10. The sensor of claim 5, wherein the markers constituting the marker groups are thin strips, a number of strip markers are aligned in parallel to form each marker group, and the strip markers constituting each marker group have different colors from each other.

11. The sensor of claim 10, wherein said marker groups are two marker groups embedded in the elastic body.

12. The sensor of claim 11, wherein the strip markers for each marker group perpendicularly intersect each other.

13. The sensor of claim 10, wherein side portions of the strip markers extend along an observation direction.

14. The sensor of claim 13, wherein the side portions of the strip markers have different colors for each side.

15. The sensor of claim 10, wherein the side portions of the strip markers are inclined to an observation direction.

16. The sensor of claim 3, wherein the tactile portion comprises a plurality of plane markers arranged facing an observation direction, said plane markers are normally concealed by concealment markers, each plane marker is partitioned into a plurality of portions having different colors for each portion, and the partitioned portions having the same color constitute each marker group.

17. The sensor of claim 16, wherein said plane markers and said concealment markers are provided and spaced with each other in the elastic body, and an arrangement is made such that said plane markers are concealed by said concealment markers and not observed in a state where external force is not acting on the transparent elastic body.

18. The sensor of claim 3, wherein each marker group is a plane group comprised of a plurality of planes extending in the same direction, and extending directions and colors thereof are different between each marker group.

19. The sensor of claim 18, wherein planes constituting the plane group for each marker group are spacedly arranged with each other, and each plane constituting one marker group is arranged between each plane constituting another marker group.

20. The sensor of claim 19, wherein edges of each plane are adjoining.

21. The sensor of claim 18, wherein said tactile portion comprises two marker groups.

22. The sensor of claim 21, wherein the plane groups for respective marker groups comprise inclined surfaces that mutually extend in different directions with respect to the contact surface, and when viewing along an observation direction, all inclined surfaces extend in parallel to each other.

23. The sensor of claim 18, wherein said tactile portion comprises three marker groups.

24. The sensor of claim 18, wherein the planes constituting each marker group are adjoining with edges thereof to form stepped surfaces, said planes comprise a color filter that only allows a respective different color, said stepped surface is contacted by the object via a light guide film, there is no contact between the light guide and the stepped surfaces when there is no contact with the object, and contact between the light guide and the stepped surfaces starts when there is contact with the object such that white light filled inside the light guide passes through the color filters of the stepped surfaces and is imaged as colored light.

25. The sensor of claim 1, said sensor further comprising one or more light source.

26. The sensor of claim 1, wherein said imaging device is arranged at a position opposite to the side of the transparent elastic body contacted by the object.

27. The sensor of claim 1, wherein said markers are made of an elastic material.

28. The sensor of claim 1, wherein portions of the elastic body constitute colored markers.

29. A tactile portion for an optical tactile sensor, said portion comprising a transparent elastic body and a plurality of marker groups provided in said elastic body, and each marker group being comprised of a number of colored markers, with markers constituting different marker groups having different colors for each group.

30. The portion of claim 29, wherein said marker groups have different spatial arrangements from each other.

31. A sensing method using an optical tactile sensor having a tactile portion and imaging device, said tactile portion comprising a transparent elastic body and a plurality of marker groups provided in said body, each marker group being comprised of a number of colored markers, with markers constituting different marker groups having different colors for each group, said method comprising taking images of behavior of colored markers by said imaging device when said elastic body is contacted by an object and processing said images, and observing at least one of displacement, strain and inclination of markers to obtain tactile information about a plurality of degrees of freedom.

32. The method of claim 31, the method comprising selectively perceiving makers of a certain color from a plurality of colored markers having different colors.

33. The sensor of claim 1, wherein said colored marker is made of a colored material.

34. The sensor of claim 1, wherein said colored marker is a marker whose surface is coated with a colored material.

35. The sensor of claim 1, wherein said colored marker is a marker whose surface is coated with a photosensitive material.

36. The sensor of claim 1, wherein said colored marker is a marker whose surface comprises a surface for scattering light.

37. The sensor of claim 1, wherein said colored filter comprises a color filter.

* * * * *